United States Patent
Suzuki et al.

(10) Patent No.: US 8,663,435 B2
(45) Date of Patent: Mar. 4, 2014

(54) OPTICAL SEMICONDUCTOR AND METHOD FOR PRODUCING THE SAME, OPTICAL SEMICONDUCTOR DEVICE, PHOTOCATALYST, HYDROGEN PRODUCING DEVICE, AND ENERGY SYSTEM

(75) Inventors: Takahiro Suzuki, Osaka (JP); Takaiki Nomura, Osaka (JP); Satoru Tamura, Osaka (JP); Kazuhito Hato, Osaka (JP); Noboru Taniguchi, Osaka (JP); Kenichi Tokuhiro, Osaka (JP); Nobuhiro Miyata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/482,301

(22) Filed: May 29, 2012

(65) Prior Publication Data
US 2012/0237842 A1   Sep. 20, 2012

Related U.S. Application Data

(63) Continuation of application No. PCT/JP2011/006617, filed on Nov. 28, 2011.

(30) Foreign Application Priority Data

Dec. 28, 2010   (JP) ................................ 2010-292999

(51) Int. Cl.
*C25B 9/00* (2006.01)
(52) U.S. Cl.
USPC . 204/248; 429/400; 204/290.01; 204/290.12; 423/385; 502/200
(58) Field of Classification Search
USPC .................. 205/628; 204/248–252; 429/422; 257/103
See application file for complete search history.

(56) References Cited

U.S. PATENT DOCUMENTS 4,701,008 A * 10/1987 Richard et al. ................. 385/132
5,494,743 A *  2/1996 Woodard et al. ............... 428/336

(Continued)

FOREIGN PATENT DOCUMENTS

JP        63-045106      2/1988
JP      2004-344724     12/2004

(Continued)

OTHER PUBLICATIONS

S. Venkataraj, "Towards understanding the superior properties of transition metal oxynitrides prepared by reactive DC magnetron sputtering",Thin Solid Films, vol. 502, Issues 1-2, Apr. 28, 2006, p. 228-234.*

(Continued)

*Primary Examiner* — Ula C Ruddock
*Assistant Examiner* — Osei Amponsah
(74) *Attorney, Agent, or Firm* — Hamre, Schumann, Mueller & Larson, P.C.

(57) ABSTRACT

The method for producing the optical semiconductor of the present disclosure includes a mixing step of producing a mixture containing a reduction inhibitor and a niobium compound that contains at least oxygen in its composition; a nitriding step of nitriding the mixture by the reaction between the mixture and a nitrogen compound gas; and a washing step of isolating niobium oxynitride from the material obtained through the nitriding step by dissolving chemical species other than niobium oxynitride with a washing liquid. The optical semiconductor of the present disclosure substantially consists of niobium oxynitride having a crystal structure of baddeleyite and having a composition represented by the composition formula, NbON.

4 Claims, 8 Drawing Sheets

(56) References Cited

U.S. PATENT DOCUMENTS

| | | | |
|---|---|---|---|
| 7,481,914 B2 * | 1/2009 | McNulty et al. | 205/628 |
| 7,670,712 B2 | 3/2010 | Ota et al. | |
| 2009/0286068 A1 * | 11/2009 | Niguma et al. | 428/327 |

FOREIGN PATENT DOCUMENTS

| | | | | |
|---|---|---|---|---|
| JP | 2005-133174 | * | 5/2005 | H01L 31/04 |
| JP | 2005133174 A | * | 5/2005 | C25B 9/00 |
| JP | 2005-161203 | | 6/2005 | |
| JP | 2009-208070 | | 9/2009 | |
| JP | 2009-231196 | | 10/2009 | |

OTHER PUBLICATIONS

Weishaupt, et al., "Darstellung der Oxidnitride VON, NbON and TaON. Die Kristallstruktur von NbON and TaON.", Zeitschrift für Anorganische und Allgemeine Chemie", vol. 429, 1977, pp. 261-269—Abstract.

Ohnishi, et al., "Niobium-based catalysts prepared by reactive radio-frequency magnetron sputtering and arc plasma methods as non-noble metal cathode catalysts for polymer electrolyte fuel cells", Electrochimica Acta, vol. 55, No. 19, 2010, pp. 5393-5400.

Lumey, et al., "First-principles electronic structure, chemical bonding, and high-pressure phase prediction of the oxynitrides of vanadium, niobium, and tantalum", Zeitschrift für Anorganische und Allgemeine Chemie, vol. 631, No. 5, 2005, pp. 887-893.

Fujimoto, et al., "Synthesis of Rock Salt Niobium Nitride and Niobium Oxynitride by Ammonia Nitriding Method and Superconductivity thereof", Summaries of Joint Conference of the Chugoku Shikoku Branch and the Kyushu Branch of the Chemical Society of Japan, 2001, p. 90—full translation.

Brayner, et al., Synthesis and molding of niobium oxynitrides with macropores generation Reactivity and Stability in cyclohexane dehydrogenation, Catalysis Today, vol. 57, No. 3-4, 2000, pp. 219-223.

Takagaki, et al., "Highly Dispersed Niobium Catalyst on Carbon Black by Polymerized Complex Method as PEFC Cathode Catalyst", Journal of the Electrochemical Society, vol. 156, No. 7, 2009, pp. B811-B815.

* cited by examiner (a) First Intermediate Product
(b) Second Intermediate Product
(c) Third Intermediate Product
(d) Finally Synthesized Product

OPTICAL SEMICONDUCTOR AND METHOD FOR PRODUCING THE SAME, OPTICAL SEMICONDUCTOR DEVICE, PHOTOCATALYST, HYDROGEN PRODUCING DEVICE, AND ENERGY SYSTEM

This is a continuation of International Application No. PCT/JP2011/006617 with an international filing date of Nov. 28, 2011, which claims the foreign priority of Japanese Patent Application No. 2010-292999, filed on Dec. 28, 2010, the entire contents of both of which are hereby incorporated by reference.

BACKGROUND OF THE INVENTION

1. Field of the Invention

The present disclosure relates to an optical semiconductor and a method for producing the optical semiconductor, and to an optical semiconductor device, a photocatalyst, a hydrogen producing device that includes the photocatalyst, and an energy system that includes the hydrogen producing device.

2. Description of Related Art

In an optical semiconductor, electron-hole pairs are generated by irradiation of the optical semiconductor with light. Optical semiconductors are promising since they can be used for applications such as LEDs and lasers for extracting light generated in recombination of the electron-hole pairs, solar cells for extracting the photovoltaic power as electrical energy by separating the pairs spatially, and photocatalysts for producing hydrogen directly from water and sunlight. As one group of optical semiconductors that absorb or emit light in the ultraviolet to visible light region, nitrides and oxynitrides can be mentioned. Examples thereof include nitrides and oxynitrides of tantalum, titanium, aluminium, gallium, indium, etc. However, no reports have been made so far on the use of niobium oxynitride as an optical semiconductor. Reported methods for synthesizing niobium oxynitride and the physical characteristics thereof are shown below.

As a method for producing niobium oxynitride, a method of using niobium oxychloride, etc., as a raw material and a method of calcinating niobium pentoxide in an ammonia atmosphere, for example, are known (see, for example, Zeitschrift für anorganische und allgemeine Chemie, 429, 261-269 (1977), Journal of The Electrochemical Society, 156 (7) B811-B815 (2009), and JP 2009-208070 A).

Zeitschrift für anorganische und allgemeine Chemie, 429, 261-269 (1977) discloses niobium oxynitride synthesized using niobium oxychloride or niobium pentachloride as a niobium source, and the synthesis method thereof.

In the case of using niobium oxychloride as a starting material, niobium oxychloride ($NbOCl_3$) and liquid ammonia are reacted with each other. In the sample obtained by the reaction, ammonium chloride ($NH_4Cl$) is present in a mixed state as a by-product. Therefore, in order to remove the ammonium chloride from the material through sublimation, the obtained material is heated at 653 K under vacuum. The sample after the heating is further calcinated at 773 K for a long period of time. This allows niobium oxynitride (NbON) that is black in color to be obtained.

In the case of using niobium pentachloride as a starting material, niobium pentachloride ($NbCl_5$) and nitrogen chloride ($ClN_3$) are first reacted with each other to obtain niobium tetrachloride azide ($NbCl_4N_3$). The resultant niobium tetrachloride azide is hydrolyzed to form niobium oxychloride azide ($NbOCl_2N_3$). This is subjected to pyrolysis at 773 K, thereby allowing niobium oxynitride (NbON) to be obtained.

Zeitschrift für anorganische and allgemeine Chemie, 429, 261-269 (1977) discloses that niobium oxynitride obtained by the above-mentioned method has a crystal structure of baddeleyite and is represented by the composition formula of NbON, in accordance with the X-ray crystal structure analysis.

Journal of The Electrochemical Society, 156 (7) B811-B815 (2009) and JP 2009-208070 A each disclose niobium oxynitride synthesized using niobium pentachloride as a niobium source by heat treatment in a flowing ammonia gas atmosphere, and the synthesis method thereof. Niobium chloride ($NbCl_5$) is employed as a raw material. This is dissolved by stirring in a solution consisting of ethylene glycol ($HOCH_2CH_2OH$), citric acid ($HOOCCH_2C(OH)(COOH)CH_2COOH$), and methanol ($CH_3OH$). Thereafter, this solution is stirred in an air atmosphere while being heated to 423 K. This causes dehydration esterification reaction between the carboxyl group of oxycarboxylic acid and the hydroxyl group of glycol, thus allowing a polyester polymer gel that has undergone polyesterification to be obtained. Then, the resultant gel is subjected to heat treatment at 773 K for 3 hours in a flowing nitrogen atmosphere at 0.1 L/minute. Subsequently, it is further subjected to heat treatment at 1023 K for 10 hours in a flowing ammonia gas atmosphere at 0.5 L/minute. Thus, niobium oxynitride (Nb—O—N) is obtained. The X-ray diffraction pattern disclosed in Journal of The Electrochemical Society, 156 (7) B811-B815 (2009) shows that this Nb—O—N is a mixture of niobium pentoxide ($Nb_2O_5$) and niobium nitride (NbN).

SUMMARY OF THE INVENTION

One non-limiting and exemplary embodiment provides an optical semiconductor capable of effectively utilizing the light in the long-wavelength region. Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature; an optical semiconductor substantially consisting of niobium oxynitride having a crystal structure of baddeleyite and having a composition represented by the composition formula, NbON.

The optical semiconductor of the present disclosure substantially consists of niobium oxynitride (NbON). The optical semiconductor of the present disclosure can cause photoexcitation by absorbing light having a longer wavelength compared to optical semiconductors consisting of niobium pentoxide that are conventionally known as optical semiconductors.

These general and specific aspects may be implemented using a device, a system, and a method, and any combination of devices, systems, and methods.

Figure 1:
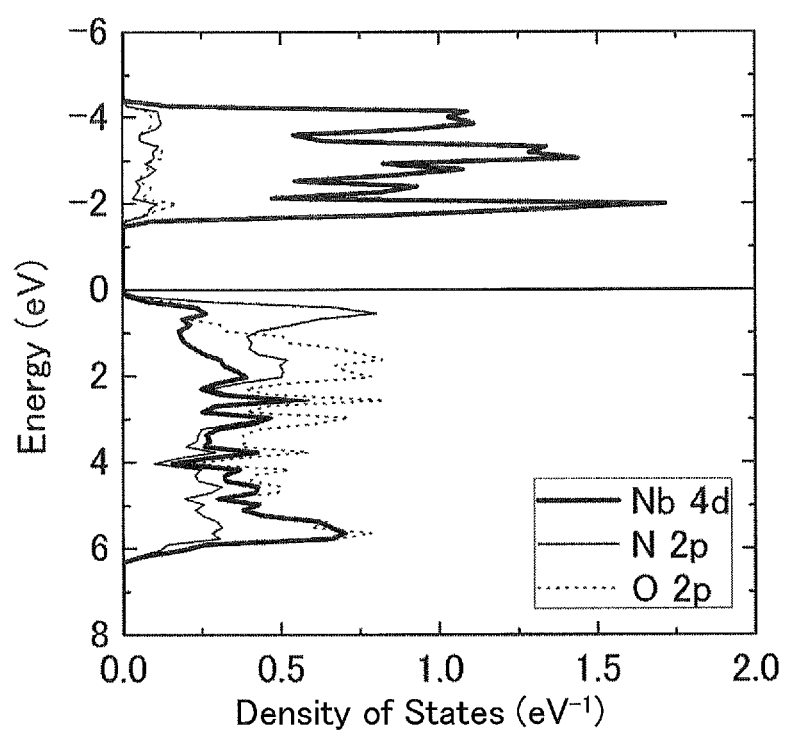
FIG. 1 is a graph showing the density of states distribution of NbON obtained according to the first-principle band calculation.

DETAILED DESCRIPTION (Process to Achieve Embodiments of the Present Disclosure)

The inventors have found that the conventionally proposed techniques mentioned above in "Description of Related Art" are problematic because of the following points.

It is explicitly stated in Zeitschrift für anorganische und allgemeine Chemie, 429, 261-269 (1977) that NbON phase having a crystal structure of baddeleyite was detected in the resultant niobium oxynitride. However, by-products and/or impurities are considered to remain in the material synthesized by the method disclosed in Zeitschrift für anorganische und allgemeine Chemie, 429, 261-269 (1977) other than NbON phase having a crystal structure of baddeleyite. As one evidence for that, there can be mentioned a description on the band gap of NbON. Table 1 below shows the actual measured value of the band gap of tantalum oxynitride (TaON) having the same crystal structure as NbON, the estimated values of the band gaps of TaON and NbON calculated according to the first-principle band calculation, and the true value of the band gap of NbON to be estimated from these values. The first-principle band calculation was performed using the PAW (Projector Augmented Wave) method on the basis of density functional theory. In this calculation, GGA-PBE (Generalized Gradient Approximation of Perdew-Burke-Ernzerhof (generalized density gradient correction)) functionals are used for the representation of the electron density by which the exchange-correlation term is given as interactions between electrons. As a result, the true value of the band gap of NbON is estimated to be about 2.0 eV. However, Zeitschrift für anorganische und allgemeine Chemie, 429, 261-269 (1977) describes that the resultant niobium oxynitride is black in color. This means that the value of the band gap of the resultant sample is 1.5 eV or less. That is, it is strongly suggested that the niobium oxynitride disclosed in Zeitschrift für anorganische und allgemeine Chemie, 429, 261-269 (1977) contains by-products and/or impurities such as chemical species that are produced by reducing niobium as compared to the NbON (where Nb has a valence of +5), other than the NbON phase having a crystal structure of baddeleyite.

TABLE 1

| | Estimated value of band gap according to the first-principle band calculation [eV] | Actual measured value of band gap [eV] | True value of band gap to be estimated [eV] |
| --- | --- | --- | --- |
| TaON | 1.9 | 2.5 | — |
| NbON | 1.5 | — | 2.0 |

Further, in the method for producing niobium oxynitride disclosed in Zeitschrift für anorganische und allgemeine Chemie, 429, 261-269 (1977), niobium tetrachloride azide that is azide salt of niobium is produced in the course of the synthesis process. Generally, azide salts of heavy metals are explosive, and thus treated as hazardous materials that are difficult to handle. Therefore, the synthesis process of Zeitschrift für anorganische und allgemeine Chemie, 429, 261-269 (1977) is exceptionally difficult to perform, and is disadvantageous in that only a very slight amount of niobium oxynitride can be synthesized by the process because of the need to avoid explosion.

Zeitschrift für anorganische und allgemeine Chemie, 429, 261-269 (1977) fails to disclose that a material having a crystal structure of baddeleyite and represented by the composition formula, NbON, can be used as an optical semiconductor.

Niobium oxynitride synthesized by the method disclosed in each of Journal of The Electrochemical Society, 156 (7) B811-B815 (2009) and JP 2009-208070 A is niobium oxynitride in which nitrided NbN phase and unnitrided $Nb_2O_5$ phase are present in a mixed state, and is not niobium oxynitride that has a crystal structure of baddeleyite. This is because, as disclosed in JP 2009-208070 A, ammonia acts not only as a nitriding agent but also as a reductant in the nitriding reaction under an ammonia gas atmosphere. This action of ammonia as a reductant is to reduce the valence of the niobium source that once was +5 in a starting material to +3. As a result, only NbN that is a conductor is selectively synthesized. Accordingly, it is impossible to synthesize niobium oxynitride having a crystal structure of baddeleyite by the synthesis method of niobium oxynitride disclosed in each of Journal of The Electrochemical Society, 156 (7) B811-B815 (2009) and JP 2009-208070 A, resulting in a failure to obtain a material suitable for optical semiconductors.

Then, the inventors have achieved, through a series of studies and investigations, to provide an optical semiconductor capable of effectively utilizing the light in the long-wavelength region by providing a production method that enables niobium oxynitride to be supplied safely, conveniently, inexpensively, and in a large amount. Further, they have achieved to provide an optical semiconductor device, a photocatalyst, a hydrogen producing device, and an energy system, using the above-mentioned optical semiconductor.

First aspect of the present disclosure provides an optical semiconductor substantially consisting of niobium oxynitride having a crystal structure of baddeleyite and having a composition represented by the composition formula, NbON. The optical semiconductor of the first aspect can cause photoexcitation by absorbing light having a longer wavelength compared to optical semiconductors consisting of niobium pentoxide that are conventionally known as optical semiconductors.

Second aspect of the present disclosure provides an optical semiconductor that may consist of single-phase NbON in the first aspect. The optical semiconductor of the second aspect allows the function of niobium oxynitride as an optical semiconductor to be stably obtained.

Third aspect of the present disclosure provides a method for producing an optical semiconductor, including: a mixing step of producing a mixture containing a reduction inhibitor and a niobium compound that contains at least oxygen in its composition; a nitriding step of nitriding the mixture by the reaction between the mixture and a nitrogen compound gas; and a washing step of isolating niobium oxynitride from the material obtained through the nitriding step by dissolving chemical species other than niobium oxynitride with a washing liquid.

In the method for producing the optical semiconductor of the third aspect, niobium oxynitride is synthesized by the reaction of a mixture of a niobium compound and a reduction inhibitor with a nitrogen compound gas. It is possible to prevent the reduction of niobium due to the nitrogen compound gas by allowing the reduction inhibitor and the niobium compound to coexist in the nitriding step. As a result, niobium can maintain the pentavalent state, which is its highest valence, in the material during the reaction and after the reaction. Therefore, according to the production method of the third aspect, niobium oxynitride having a crystal structure of baddeleyite and represented by the composition formula, NbON (where Nb has a valence of +5) can be obtained. Further, all the starting materials to be used and by-products are chemically stable in the production method of the third aspect. Furthermore, only three steps are required for the production, i.e., the step of mixing a reduction inhibitor and a niobium compound that contains at least oxygen in its composition; the step of nitriding the mixture in a nitrogen compound gas atmosphere; and the step of washing for removing substances other than niobium oxynitride. Hence, the production method of the third aspect does not require any special steps. This allows niobium oxynitride to be synthesized safely, conveniently, and inexpensively. Moreover, all the aforementioned three steps can be easily scaled up. Therefore, it is also possible to produce the optical semiconductor of the first aspect in a large amount by using the production method of the third aspect.

Fourth aspect of the present disclosure provides a method for producing an optical semiconductor in which the reduction inhibitor may be a compound containing at least one element selected from the group consisting of tin, titanium, indium, and germanium, in the third aspect. The compound containing at least one element selected from the group consisting of tin, titanium, indium, and germanium can effectively suppress the reduction of niobium in the nitriding step.

Fifth aspect of the present disclosure provides a method for producing an optical semiconductor in which, when the mixing ratio of the reduction inhibitor to the niobium compound is defined as:

$X$=(amount of substance of metal or metal ion in the reduction inhibitor)/(amount of substance of niobium in the niobium compound), X may satisfy $1 \leq X \leq 5$, in the third or fourth aspect. The reduction of the niobium compound can be suppressed more reliably in the subsequent nitriding step by satisfying such a mixing ratio. Accordingly, niobium oxynitride having a crystal structure of baddeleyite and having a composition represented by the composition formula, NbON, can be obtained more easily.

Sixth aspect of the present disclosure provides a method for producing an optical semiconductor in which the reaction temperature in the nitriding step may be 773 K to 1023 K, in any one of the third to fifth aspects. By setting the reaction temperature within such a range, it is possible to allow the nitriding reaction to proceed more reliably while suppressing the reduction of the niobium compound. Further, it is also made possible to ease the conditions such as the time required for nitriding and/or the flow rate of the nitrogen compound gas.

Seventh aspect of the present disclosure provides a method for producing an optical semiconductor in which the nitrogen compound gas used in the nitriding step may contain at least ammonia, in any one of the third to sixth aspects. By using a nitrogen compound gas containing at least ammonia as the nitrogen compound gas, it is possible to allow the nitriding reaction to proceed more reliably while suppressing the reduction of the niobium compound.

Eighth aspect of the present disclosure provides a method for producing an optical semiconductor in which the flow rate of the nitrogen compound gas used in the nitriding step may be 0.05 cm second$^{-1}$ to 5.00 cm second$^{-1}$ as a linear flow rate, in any one of the third to seventh aspects. By setting the flow rate within such a range, it is possible to allow the nitriding reaction to proceed more reliably while suppressing the reduction of the niobium compound. Further, it also is made possible to ease the conditions such as the time required for nitriding and/or the temperature of the nitriding reaction.

Ninth aspect of the present disclosure provides a method for producing an optical semiconductor in which the washing liquid used in the washing step may contain at least an acidic solution or an alkaline solution, in any one of the third to eighth aspects. The material obtained in the nitriding step is immersed in this washing liquid, thereby allowing the reduction inhibitor, etc., to be efficiently dissolved therein.

Tenth aspect of the present disclosure provides an optical semiconductor device including the optical semiconductor of the first or second aspect. The optical semiconductor device of the tenth aspect can utilize light having a longer wavelength compared to optical semiconductor devices using optical semiconductors consisting of niobium pentoxide that are conventionally known as optical semiconductors, and thus can utilize sunlight efficiently.

Eleventh aspect of the present disclosure provides a photocatalyst consisting of the optical semiconductor of the second aspect. The photocatalyst of the eleventh aspect can utilize light having a longer wavelength compared to photocatalysts using optical semiconductors consisting of niobium pentoxide that are conventionally known as optical semiconductors, and thus can utilize sunlight efficiently.

Twelfth aspect of the present disclosure provides a hydrogen producing device including: the photocatalyst of the eleventh aspect; an electrolyte that contains water and that is in contact with the photocatalyst; and a housing that accommodates the photocatalyst and the electrolyte. In the hydrogen producing device, hydrogen is generated through decomposition of the water caused by irradiation of the photocatalyst with light. The hydrogen producing device of the twelfth aspect can utilize light having a longer wavelength compared to hydrogen producing devices using optical semiconductors consisting of niobium pentoxide that are conventionally known as optical semiconductors, and thus can utilize sunlight efficiently.

Thirteenth aspect of the present disclosure provides an energy system including: the hydrogen producing device of the twelfth aspect; a fuel cell; and a line for supplying hydrogen produced in the hydrogen producing device to the fuel cell. The energy system of the thirteenth aspect can utilize light having a longer wavelength compared to energy systems using optical semiconductors consisting of niobium pentoxide that are conventionally known as optical semiconductors, and thus can utilize sunlight efficiently.

Hereinafter, embodiments of the present disclosure are described with reference to drawings.

(Embodiment 1)

An embodiment of the optical semiconductor of the present disclosure is described. The optical semiconductor of this embodiment substantially consists of niobium oxynitride. This niobium oxynitride has a crystal structure of baddeleyite and a composition represented by the composition formula, NbON. The phrase "optical semiconductor substantially consisting of niobium oxynitride" herein means that the optical semiconductor of the present disclosure includes an optical semiconductor that contains, for example, a slight amount of components such as impurities other than niobium oxynitride, in addition to an optical semiconductor that consists of niobium oxynitride. Specifically, it means an optical semiconductor that contains at least 90 mol %, for example, at least 99 mol %, of niobium oxynitride. For example, in the case where the "optical semiconductor substantially consisting of niobium oxynitride" contains an impurity, the content of the impurity, for example, is not more than the detection limit of the X-ray crystal structure analysis.

In order to stably obtain the function of niobium oxynitride as an optical semiconductor, the optical semiconductor of this embodiment, for example, consists of the above-mentioned niobium oxynitride. That is, the optical semiconductor of this embodiment, for example, consists of single-phase NbON.

Next, an example of the method for producing an optical semiconductor by which the optical semiconductor of this embodiment can be produced is described.

The niobium oxynitride that forms the optical semiconductor of this embodiment can be synthesized by the reaction of a niobium compound that serves as a starting material with a nitrogen compound gas in coexistence with a reduction inhibitor. More specifically, the production method of this embodiment includes a mixing step of producing a mixture containing a reduction inhibitor and a niobium compound that contains at least oxygen in its composition; a nitriding step of nitriding the mixture by the reaction between the mixture and a nitrogen compound gas; and a washing step of isolating niobium oxynitride from the material obtained through the nitriding step by dissolving chemical species other than niobium oxynitride with a washing liquid.

First, the mixing step is described. The niobium compound that serves as a starting material contains at least oxygen in its composition. For example, niobium oxide, niobium hydroxide, niobium acetate, niobium carbonate, and niobium oxalate can be used. Such a niobium compound is mixed with a reduction inhibitor to produce a mixture. As the reduction inhibitor, one having a function of suppressing the reduction of niobium in the subsequent nitriding step can be used. As the reduction inhibitor, a compound containing at least one element selected from the group consisting of tin, titanium, indium, and germanium can be used suitably.

The mixing ratio of the reduction inhibitor to the niobium compound can be appropriately selected depending on specific materials to be used as the niobium compound and the reduction inhibitor. However, when the mixing ratio of the reduction inhibitor to the niobium compound is defined as:

$X$=(amount of substance of metal or metal ion in the reduction inhibitor)/(amount of substance of niobium in the niobium compound), X satisfies 1≤X≤5, for example. The reduction of the niobium compound can be suppressed more reliably in the subsequent nitriding step by satisfying such a mixing ratio. Accordingly, niobium oxynitride having a crystal structure of baddeleyite and having a composition represented by the composition formula, NbON, can be obtained more easily.

The specific method for mixing the niobium compound and the reduction inhibitor is not specifically limited. For example, a mixture can be obtained by grinding and mixing a niobium compound in powder form and a reduction inhibitor in powder form.

Next, the thus prepared mixture of the niobium compound and the reduction inhibitor is reacted with a nitrogen compound gas (nitriding step). As the nitrogen compound gas, ammonia, nitrogen, and hydrazine, for example, can be suitably used. Among these, a nitrogen compound gas containing at least ammonia, for example, is used. In this reaction, the nitrogen compound gas has a function as a reductant in addition to a function as a nitriding reagent. Supposed that only the niobium compound is reacted with the nitrogen compound gas, niobium contained in the niobium compound is reduced due to the function of the nitrogen compound gas as a reductant. As a result, niobium nitride (NbN, where Nb has a valence of +3) as disclosed in Journal of The Electrochemical Society, 156 (7) B811-B815 (2009) and JP 2009-208070 A is synthesized. However, since the niobium compound is mixed with the reduction inhibitor in this embodiment, the reduction inhibitor is reduced prior to the niobium compound, thereby preventing the reduction of the niobium compound. In this way, the function as a nitriding reagent among the properties of the nitrogen compound gas acts on the niobium compound. Ultimately, the nitrogen compound gas can nitride the niobium compound without reducing it. At that time, the reaction temperature, for example, is 773 K to 1023 K. By setting the reaction temperature within such a range, it is possible to allow the nitriding reaction to proceed more reliably while suppressing the reduction of the niobium compound. Further, it is also made possible to ease the conditions such as the time required for nitriding and/or the flow rate of the nitrogen compound gas.

In the nitriding step, the flow rate of the nitrogen compound gas, for example, is 0.05 cm second$^{-1}$ to 5.00 cm second$^{-1}$ as a linear flow rate. By setting the flow rate within such a range, it is possible to allow the nitriding reaction to proceed more reliably while suppressing the reduction of the niobium compound. Further, it is also made possible to ease the conditions such as the time required for nitriding and/or the temperature of the nitriding reaction.

By the above procedures, a mixture of NbON and the reduction inhibitor that has been partially or completely reduced can be obtained as a material after the reaction. Next, in order to remove chemical species other than niobium oxynitride (the reduction inhibitor, the reduced product of the reduction inhibitor, etc.) from this mixture, washing is carried out using a washing liquid (washing step). Thereby, niobium oxynitride having a crystal structure of baddeleyite and having a composition represented by the composition formula, NbON, is obtained. It is also possible to obtain single-phase NbON using the production method of the present embodiment by appropriately selecting, for example, the reaction temperature and the flow rate of the nitrogen compound gas in the nitriding step, and the washing liquid in the washing step. The washing liquid, for example, contains an acidic solution or alkaline solution. In this regard, an appropriate acidic solution or alkaline solution may be selected depending on the type of reduction inhibitor to be used. The mixture is immersed in this washing liquid, thereby allowing the reduction inhibitor, etc., to be dissolved completely therein. Thereafter, the residual solid content in the washing liquid is taken out, and washed with pure water, followed by drying. Further, the above-mentioned subsequent process of "mixing of the reduction inhibitor, reaction with the nitrogen compound gas, and removal of the reduction inhibitor", that is, the mixing step, the nitriding step, and the washing step can be repeated, as needed. By the above procedures, a target optical semiconductor consisting of single-phase NbON can be obtained.

The optical semiconductor of this embodiment can be applied to optical semiconductor devices such as LEDs, lasers, and solar cells. Accordingly, LEDs, lasers, and solar cells, for example, can be embodied as an optical semiconductor device provided with the optical semiconductor of this embodiment.

(Embodiment 2)

An embodiment of the photocatalyst of the present disclosure is described. The photocatalyst of this embodiment consists of the optical semiconductor described in Embodiment 1. Niobium oxynitride (NbON) described in Embodiment 1 can be used as a photocatalyst. Hereinafter, the reason for that is described.

FIG. 1 shows the density of states distribution of NbON obtained according to the first-principle band calculation. It can be seen from this figure that the valence band mainly consisting of N2p orbitals, the conduction band mainly consisting of Nb4d orbitals, and the band gap interposed between these two are present in the band structure of NbON. The actual measured value of the band gap width is 2.2 eV as described later in Example 1. This is equivalent to the energy of light having a wavelength of 560 nm. That is, when NbON is irradiated with light having a wavelength of 560 nm or less, electrons present in the valence band absorb light to be excited into the conduction band. Here, when a reactive substrate is present in the vicinity of the surface of NbON and the redox potential thereof is located at a potential on the positive side with respect to the bottom of the conduction band of NbON, the excited electrons move from NbON to the reactive substrate and the reduction of the reactive substrate can proceed. Examples of the reactive substrate having such a redox potential include water, proton, oxygen, metal ions such as silver (I) ion and iron (III) ion, and iodate ion. On the other hand, holes are produced in the valence band with the photoexcitation of electrons. Here, when a reactive substrate is present in the vicinity of the surface of NbON and the redox potential thereof is located at a potential on the negative side with respect to the top of the valence band of NbON, holes move from NbON to the reactive substrate and the oxidation of the reactive substrate can proceed. Examples of the reactive substrate having such a redox potential include water, hydroxide ion, metal ions such as iron (II) ion, iodide ion, and an organic compound. Such a phenomenon shows that NbON can act as a photocatalyst.

(Embodiment 3)

An embodiment of the hydrogen producing device of the present disclosure is described. The hydrogen producing device of this embodiment uses the photocatalyst (photocatalyst of Embodiment 2) consisting of the optical semiconductor described in Embodiment 1, and produces hydrogen through decomposition of water by irradiation of the photocatalyst with light.

Figure 2:
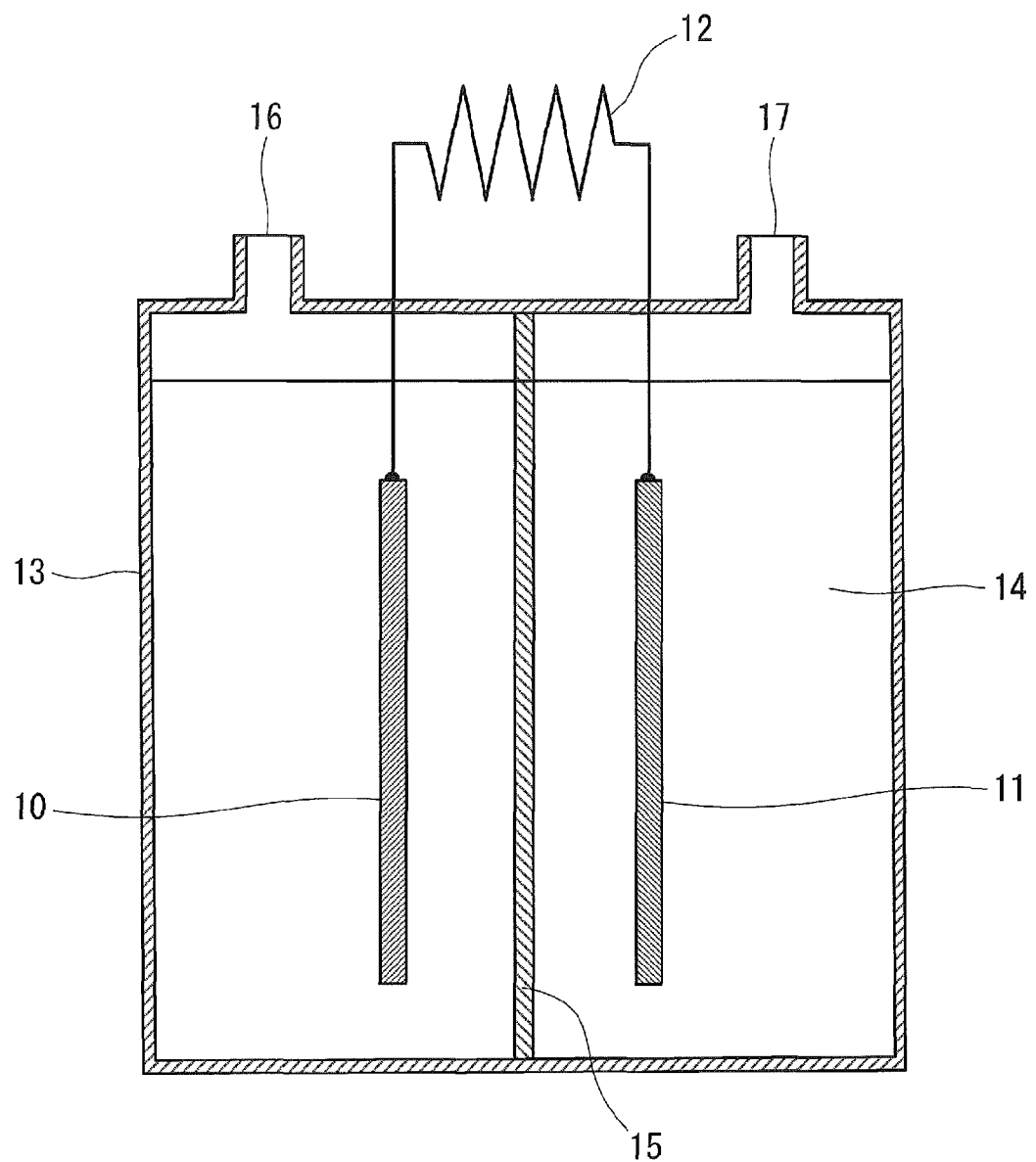
FIG. 2 is a schematic view showing one embodiment of the hydrogen producing device of the present disclosure.

FIG. 2 shows a schematic view of the hydrogen producing device of this embodiment. It should be noted that the hydrogen producing device of the present disclosure is not limited to the configuration shown in FIG. 2.

The hydrogen producing device includes, a photoelectrode 10 in which the photocatalyst described in Embodiment 2 is provided on a conductive substrate, a counter electrode (counter electrode made of a conductive substance such as metal and carbon or a counter electrode having a configuration in which a metal or the like is supported by a conductive base material) 11 made of an electrically conductive material, an electrolyte 14 containing water, and a housing 13 accommodating these components. The photoelectrode 10 and the counter electrode 11 are connected to each other by an external circuit 12. The photocatalyst provided in the photoelectrode 10 is not necessarily a single-phase semiconductor. The photocatalyst may be a complex consisting of a plurality of types of semiconductors or may support a metal or the like that functions as a co-catalyst. It is also possible to provide a mechanism capable of applying a bias between the photoelectrode 10 and the counter electrode 11.

Both the photoelectrode 10 and the counter electrode 11 are accommodated in the housing 13 together with the electrolyte 14. The electrolyte 14 contains water, and may further contain a supporting electrolyte, a redox material and/or a sacrificial reagent, etc.

A part of the surface of the housing 13 on the photoelectrode 10 side is composed of a material that transmits light to illuminate the photoelectrode 10, and is composed of a material that transmits at least part of light having a wavelength, for example, of 850 nm or less. The housing 13 is provided with a photoelectrode-side gas outlet 16 for discharging the gas generated on the photoelectrode 10 side, and a counter electrode-side gas outlet 17 for discharging the gas generated on the counter electrode 11 side.

The photoelectrode 10 and the counter electrode 11 are desirably separated from each other by a separator 15 in order to separate the gas to be generated on the photoelectrode 10 side and the gas to be generated on the counter electrode 11 side from each other. For example, the separator 15 is made of a material that is permeable to liquids and ions contained in the liquids, but blocks gases.

The gas produced at the photoelectrode 10 and the gas produced at the counter electrode 11 are discharged out of the housing 13 respectively through the photoelectrode-side gas outlet 16 and the counter electrode-side gas outlet 17.

A mechanism for introducing water that has been reduced due to decomposition may be further provided in the housing 13.

Further, the housing 13 may be provided with an inlet and an outlet of the electrolyte 14 on the photoelectrode side and the counter electrode side, so as to have a configuration that allows the circulation of the electrolyte 14. In this case, the photoelectrode-side gas outlet 16 and the counter electrode-side gas outlet 17 are not necessarily provided, and it is possible to employ a configuration in which the produced gas is delivered in a mixed state with the circulating water to the gas-liquid separation apparatus provided outside the housing 13 and then hydrogen or oxygen is obtained therefrom.

(Embodiment 4)

An embodiment of the energy system of the present disclosure is described. The energy system of this embodiment is a system that uses the photocatalyst (photocatalyst of Embodiment 2) consisting of the optical semiconductor described in Embodiment 1. The energy system of this embodiment is a system in which hydrogen produced through decomposition of water by irradiation of the photocatalyst with light is supplied to a fuel cell, and then the hydrogen is converted into electrical energy.

Figure 3:
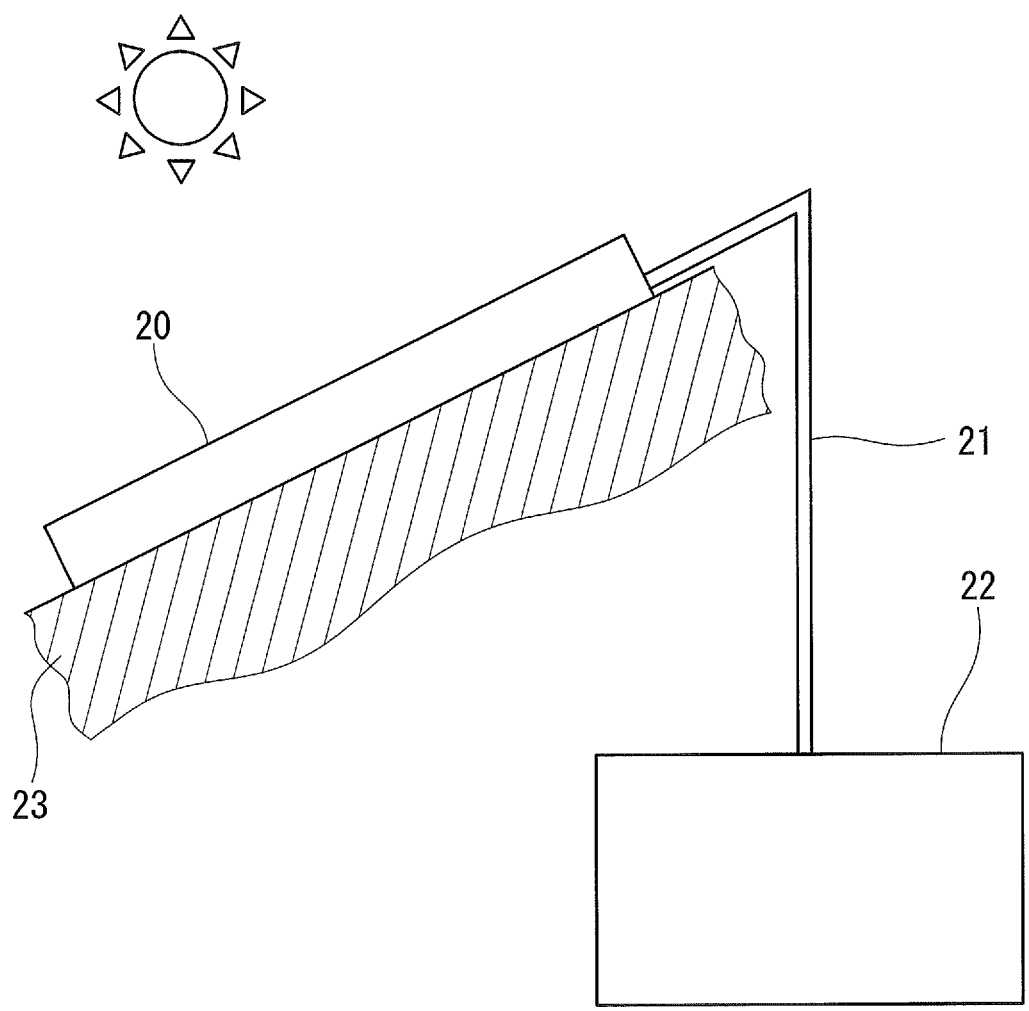
FIG. 3 is a schematic view showing one embodiment of the energy system of the present disclosure.

The energy system of this embodiment includes such a hydrogen producing device as described in Embodiment 3. FIG. 3 shows a schematic view of the energy system of this embodiment that uses sunlight. The energy system of the present disclosure is not limited to the configuration shown in FIG. 3.

The energy system of this embodiment includes such a hydrogen producing device 20 as described in Embodiment 3, a fuel cell 22, and a line 21 for supplying the hydrogen produced in the hydrogen producing device 20 to the fuel cell 22.

The hydrogen producing device 20, for example, is installed at a location 23 that is well-irradiated with sunlight, such as on the roof. In the installation, the surface of the hydrogen producing device 20 on which the photocatalyst is provided is desirably oriented to face the sun so that the hydrogen producing device 20 can efficiently receive sunlight. The hydrogen obtained in the hydrogen producing device 20 through decomposition of water caused by the photocatalytic reaction is discharged out of the hydrogen producing device 20 through the line 21 so as to be supplied to the fuel cell 22.

The line 21 may be provided, for example, with a hydrogen storage unit for storing hydrogen, a dehumidifier for removing moisture in the hydrogen, or a compressor when hydrogen is required to be compressed in storage.

EXAMPLES

Hereinafter, the present disclosure is described further in detail with reference to Examples. The following Examples are described as an example and the present disclosure is not limited to these Examples.

Example 1

Example 1 of the present disclosure is specifically described below.

Figure 4:
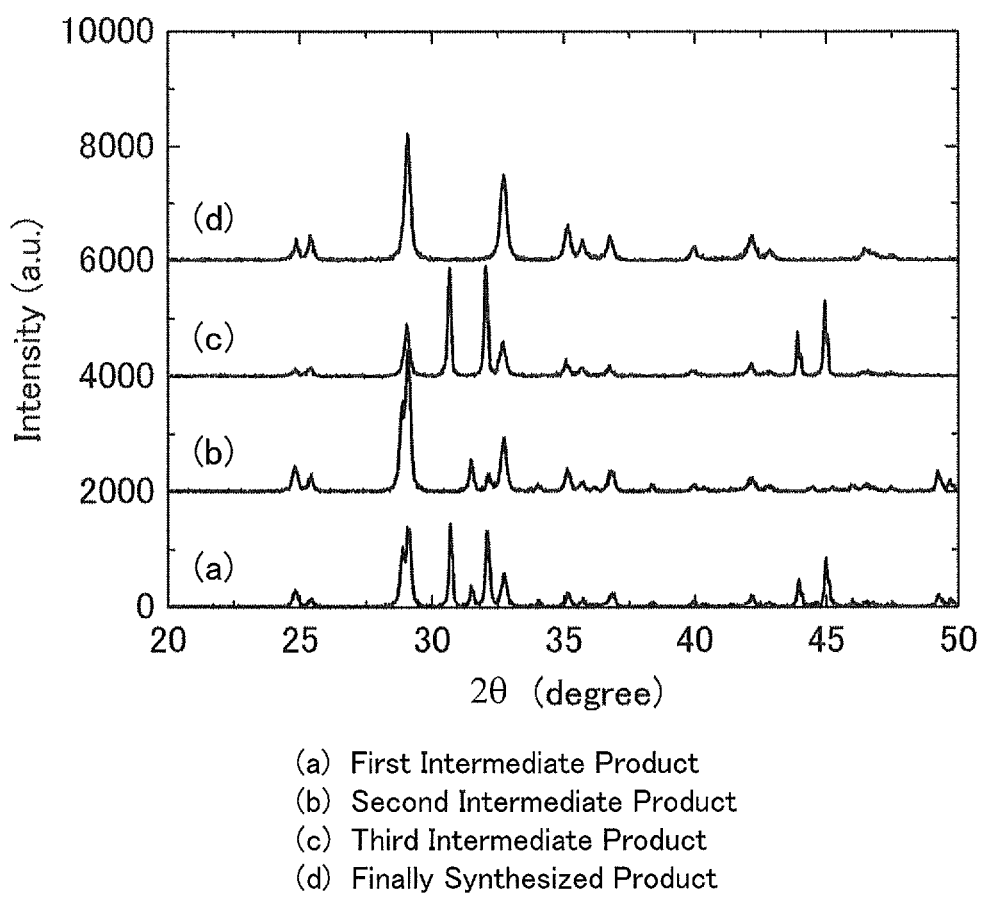
FIG. 4 shows X-ray diffraction patterns of the first to the third intermediate products and the finally synthesized NbON according to Example 1 of the present disclosure.

As a starting material, niobium pentoxide ($Nb_2O_5$ powder (1.28 g)) was used. As a reduction inhibitor, stannic oxide ($SnO_2$ powder (0.72 g)) was used. These were sufficiently ground and mixed, and thus a mixture was obtained. This mixture was heated to a temperature of 973 K at a temperature rise rate of 100 K hour$^{-1}$ under a nitrogen gas flow at a linear flow rate of 0.19 cm second$^{-1}$. Thereafter, the flowing gas was changed to an ammonia gas at a linear flow rate of 0.19 cm second$^{-1}$, and then the mixture was maintained at 973 K for 8 hours. Subsequently, the flowing gas was changed again to the nitrogen gas at a linear flow rate of 0.19 cm second$^{-1}$, and the temperature was decreased to room temperature at a temperature decrease rate of 100 K hour$^{-1}$. Thus, a first intermediate product was obtained. The first intermediate product was suspended in 200 mL of an aqueous solution of hydrochloric acid (HCl) at a concentration of 1.0 M (mol L$^{-1}$), which was stirred for 24 hours. Thereafter, it was filtrated to extract only the powder. This powder was washed with pure water, and dried at 353 K for 4 hours. Thus, a second intermediate product was obtained. $SnO_2$ powder (0.72 g) was added to the second intermediate product as a reduction inhibitor, which was sufficiently ground and mixed. Thereafter, calcination was performed under nitrogen and ammonia gas flows with the same procedure as mentioned above. Thus, a third intermediate product was obtained. The third intermediate product was subjected to suspension in the HCl solution, filtration, washing with pure water, and drying, with the same procedure as mentioned above. Thus, NbON was obtained. FIG. 4 shows X-ray diffraction patterns of the first to the third intermediate products and the finally synthesized NbON. The diffraction peaks of the first intermediate product were assigned to NbON, tin-niobium composite oxide ($SnNb_2O_6$), and metal tin (Sn). That is, the presence of NbON, $SnNb_2O_6$, and Sn was confirmed in the first intermediate product. It can be seen from this that $SnO_2$ added as a reduction inhibitor was reduced to Sn, thereby preventing the reduction of niobium. The diffraction peaks of the second intermediate product were assigned to NbON and $SnNb_2O_6$. That is, the presence of NbON and $SnNb_2O_6$ was confirmed in the second intermediate product. It can be seen from this that Sn was removed completely from the first intermediate product by being dissolved in the aqueous hydrochloric acid solution through the suspension of the first intermediate product in the aqueous hydrochloric acid solution (Reaction formula 1). The diffraction peaks of the third intermediate product were assigned to NbON and Sn. That is, the production of NbON and Sn as the third intermediate product was confirmed. All the diffraction peaks of the finally synthesized NbON obtained by dissolving and removing the Sn using the aqueous hydrochloric acid solution were assigned to NbON. That is, the production of single-phase NbON as the finally synthesized compound was confirmed.

$$Sn+2HCl \rightarrow Sn^{2+}+2Cl^-+H_2 \quad \text{(Reaction formula 1)}$$

Figure 5:
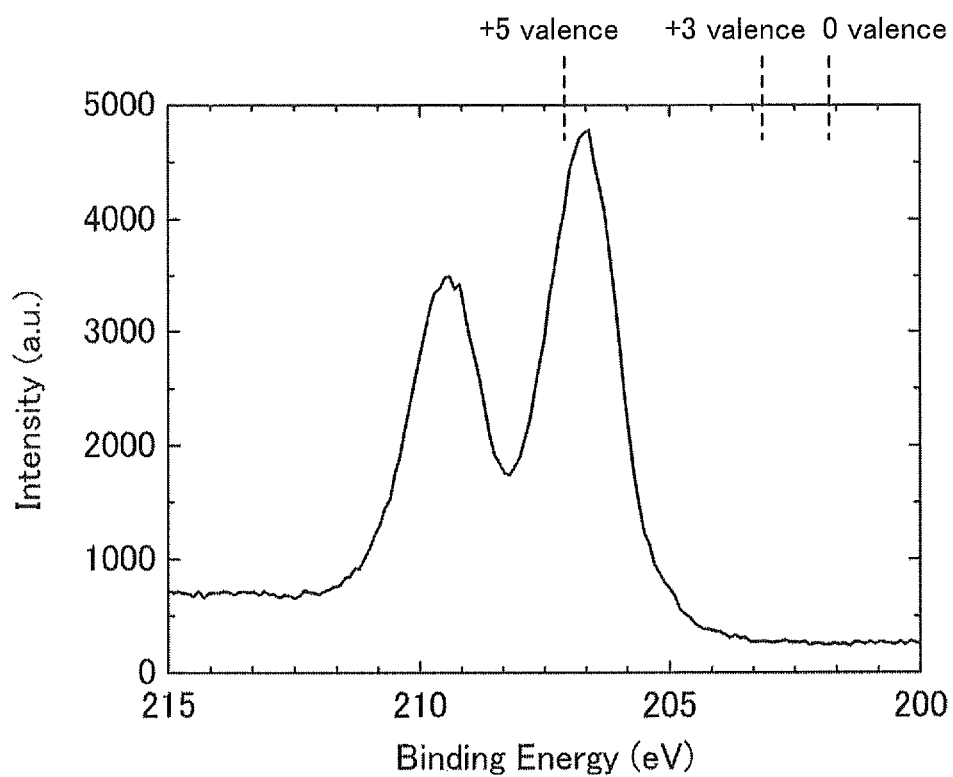
FIG. 5 shows the X-ray photoelectron spectrum of NbON according to Example 1 of the present disclosure.

FIG. 5 shows the X-ray photoelectron spectrum of NbON synthesized in this example. Nb3d5/2 peak in the spectrum shown in FIG. 5 was located at a binding energy of 206.7 eV. This means that the valence of Nb species contained in the sample was +5. The slight deviation of the peak position from the reference ($Nb_2O_5$) position (207.5 eV) of $Nb^{5+}$ toward the low-binding energy side reflects that Nb atoms are bonded not only to O atoms but also to N atoms in the case of NbON. That is, it was demonstrated that the reduction of Nb in NbON was prevented due to the effect of the reduction inhibitor ($SnO_2$), and the state of $Nb^{5+}$ was maintained before and after calcination under the ammonia gas flow.

Figure 6:
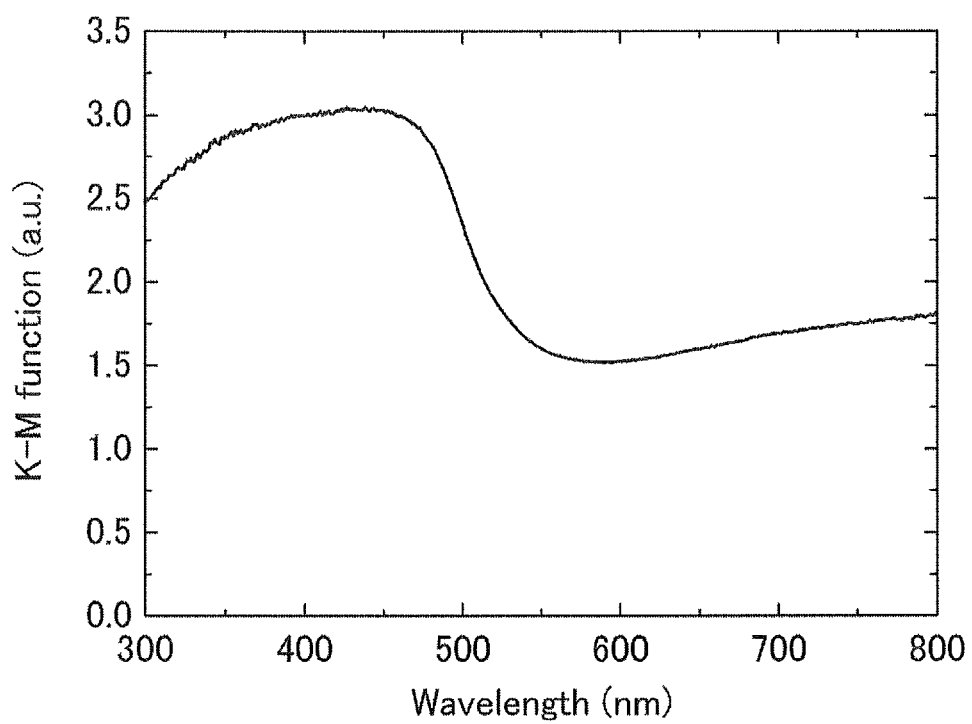
FIG. 6 shows the ultraviolet-visible diffuse reflection spectrum of NbON according to Example 1 of the present disclosure.

FIG. 6 shows the ultraviolet•visible diffuse reflection spectrum of NbON synthesized in this example. It was found from FIG. 6 that the resultant sample can absorb visible light having a wavelength up to 560 nm. This demonstrated that the sample of this example was a semiconductor with a band gap of 2.2 eV (Formula 1). This actual measured value almost matched the band gap value (2.0 eV) of NbON estimated according to the first-principle band calculation (see Table 1). It can be said from this result that the value calculated according to the first-principle band calculation was valid and NbON synthesized in this example was single-phase NbON free from impurities. The ratio of photons with a wavelength of 560 nm or less in sunlight is about 15%. In contrast, the ratio of photons with a wavelength of 380 nm or less, which can be absorbed by $Nb_2O_5$ that is a simple oxide semiconductor of niobium, is about 1%. It can be seen from this that NbON is a semiconductor having dramatically high efficiency in sunlight use as compared to $Nb_2O_5$.

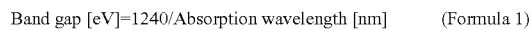

$$\text{Band gap [eV]=1240/Absorption wavelength [nm]} \quad \text{(Formula 1)}$$

Example 2

Example 2 of the present disclosure is specifically described below. NbON synthesized in this example and the synthesis method thereof were the same as NbON synthesized in Example 1 and the synthesis method thereof except that a different reduction inhibitor was used.

As a reduction inhibitor, a rutile-type titanium oxide ($TiO_2$), indium oxide ($In_2O_3$), or germanium oxide ($GeO_2$) was used. Concerning the respective reduction inhibitors, $Nb_2O_5$ powder (1.25 g)/$TiO_2$ powder (0.75 g), $Nb_2O_5$ powder (0.98 g)/$In_2O_3$ powder (1.02 g), or $Nb_2O_5$ powder (1.12 g)/$GeO_2$ powder (0.88 g), expressed as starting material/reduction inhibitor, was sufficiently ground and mixed. Thus, each mixture was obtained. The mixture was heated to a temperature of 973 K at a temperature rise rate of 100 K hour$^{-1}$ under a nitrogen gas flow at a linear flow rate of 0.19 cm second⁻¹. Thereafter, the flowing gas was changed to an ammonia gas at a linear flow rate of 0.19 cm second⁻¹, and then the mixture was maintained at 973 K for 8 hours. Subsequently, the flowing gas was changed again to the nitrogen gas at a linear flow rate of 0.19 cm second⁻¹, and the temperature was decreased to room temperature at a temperature decrease rate of 100 K hour⁻¹. Thus, a sample was obtained. Table 2 shows the results of the X-ray diffraction pattern analysis for the samples synthesized using the above-mentioned respective reduction inhibitors. The formation of NbON phase can be seen in all the reduction inhibitors used in this example from Table 2. That is, it was demonstrated that $TiO_2$, $In_2O_3$, and $GeO_2$ each have a function as a reduction inhibitor in the same manner as $SnO_2$, so that the state of $Nb^{5+}$ was maintained without reduction of at least part of Nb contained in the sample before and after sintering under an ammonia gas flow.

TABLE 2

| Reduction inhibitor | Crystal phase detected in X-ray diffraction pattern of synthesized sample |
|---|---|
| $TiO_2$ | $TiO_2$, NbON, $Nb_2O_5$, NbN |
| $In_2O_3$ | $InNbO_4$, NbON |
| $GeO_2$ | $GeO_2$, $Ge_3N_4$, NbON, $Nb_2O_5$, NbN |

Example 3

In Example 3, a reaction with an ammonia gas was performed in the nitriding step at a different temperature from in Example 1. The synthesis method of niobium oxynitride synthesized in this example was the same as the synthesis method of Example 1 except that the above-mentioned temperature was different.

As a starting material, $Nb_2O_5$ powder (1.28 g) was used. As a reduction inhibitor, $SnO_2$ powder (0.72 g) was used. These were sufficiently ground and mixed. Thus, a mixture was obtained. This mixture was heated to a temperature of 923 K at a temperature rise rate of 100 K hour⁻¹ under a nitrogen gas flow at a linear flow rate of 0.19 cm second⁻¹. Thereafter, the flowing gas was changed to an ammonia gas at a linear flow rate of 0.19 cm second⁻¹, and then the mixture was maintained at 923 K for 8 hours. Subsequently, the flowing gas was changed again to the nitrogen gas at a linear flow rate of 0.19 cm second⁻¹, and the temperature was decreased to room temperature at a temperature decrease rate of 100 K hour⁻¹. Thus, a sample was obtained. The resultant sample was subjected to the X-ray diffraction crystal structure analysis, and NbON, $SnNb_2O_6$, and Sn were detected. This sample completely matched the first intermediate product in Example 1. Accordingly, single-phase NbON can be obtained also with the reaction temperature of this example by repeating the mixing step, the nitriding step, and the washing step, in the same manner as in Example 1.

Example 4

In Example 4, a reaction with an ammonia gas was performed in the nitriding step at a different temperature and a different gas flow rate from in Example 1. The synthesis method of niobium oxynitride synthesized in this example was the same as the synthesis method of Example 1 except that the above-mentioned temperature and gas flow rate were different.

As a starting material, $Nb_2O_5$ powder (1.28 g) was used. As a reduction inhibitor, $SnO_2$ powder (0.72 g) was used. These were sufficiently ground and mixed. Thus, a mixture was obtained. The mixture was heated to a temperature of 873 K at a temperature rise rate of 100 K hour⁻¹ under a nitrogen gas flow at a linear flow rate of 2.89 cm second⁻¹. Thereafter, the flowing gas was changed to an ammonia gas at a linear flow rate of 2.89 cm second⁻¹, and then the sample was maintained at 873 K for 8 hours. Subsequently, the flowing gas was changed again to the nitrogen gas at a linear flow rate of 2.89 cm second⁻¹, and the temperature was decreased to room temperature at a temperature decrease rate of 100 K hour⁻¹. Thus, a sample was obtained. The resultant sample was subjected to the X-ray diffraction crystal structure analysis, and NbON and Sn were detected. This sample completely matched the third intermediate product in Example 1. Accordingly, single-phase NbON can be obtained also with the reaction temperature and gas flow rate of this example in the same manner as in Example 1.

Comparative Example 1

In Comparative Example 1, niobium oxynitride was synthesized without mixing a reduction inhibitor. The synthesis method of niobium oxynitride synthesized in this comparative example was the same as the synthesis method of Example 1 except that no reduction inhibitor was used.

Figure 7:
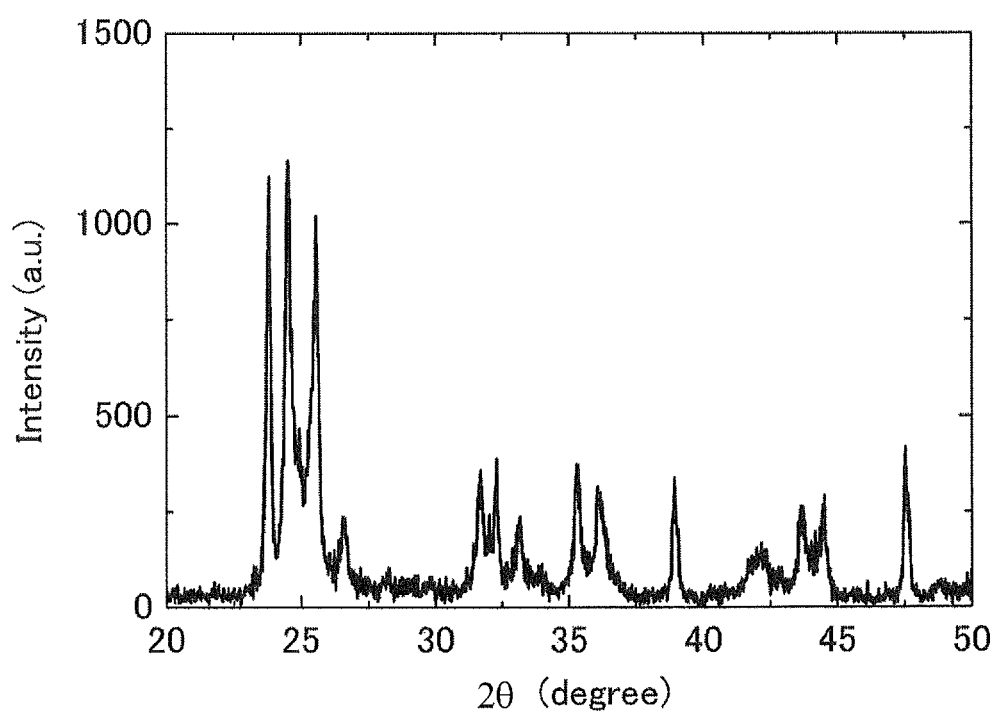
FIG. 7 shows the X-ray diffraction pattern of niobium oxynitride according to Comparative Example 1 of the present disclosure.

$Nb_2O_5$ powder (2.00 g) was heated to a temperature of 973 K at a temperature rise rate of 100 K hour⁻¹ under a nitrogen gas flow at a linear flow rate of 0.19 cm second⁻¹. Thereafter, the flowing gas was changed to an ammonia gas at a linear flow rate of 0.19 cm second⁻¹, and then the mixture was maintained at 973 K for 8 hours. Subsequently, the flowing gas was changed again to the nitrogen gas at a linear flow rate of 0.19 cm second⁻¹, and the temperature was decreased to room temperature at a temperature decrease rate of 100 K hour⁻¹. Thus, a sample was obtained. FIG. 7 shows the results of the X-ray diffraction pattern analysis for the resultant sample. The diffraction peaks of the synthesized sample were assigned to niobium nitride (NbN) and $Nb_2O_5$. That is, the presence of NbN and $Nb_2O_5$ in the synthesized sample was confirmed. It can be seen from this that, in the case where no reduction inhibitor was added, niobium in $Nb_2O_5$ was reduced by the ammonia gas to be converted into NbN (Nb had a valence of +3) phase.

Example 5

NbON synthesized in Example 1 was loaded with platinum (Pt) particles as a co-catalyst using the following method. Pt, whose amount was 1 wt %-equivalent with respect to NbON, was loaded on the surface of the NbON powder in the following way. NbON was impregnated with hexachloroplatinate (IV) ($H_2PtCl_6$) in an aqueous solution, followed by drying in a hot-water bath. Thereafter, it was subjected to hydrogen reduction at 473 K for 2 hours. Thus, Pt-loaded NbON was obtained.

Figure 8:
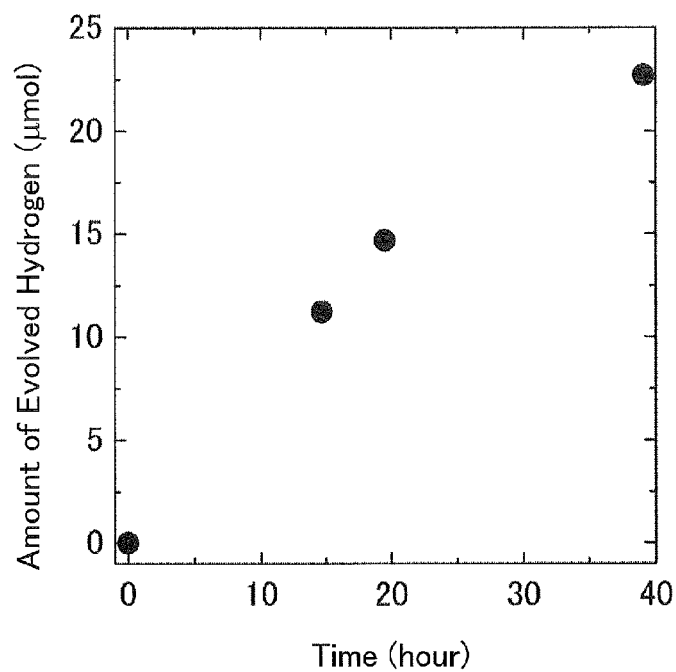
FIG. 8 is a graph showing time course of hydrogen production using the optical semiconductor according to Example 5 of the present disclosure under light irradiation at a wavelength of 420 nm to 800 nm.

Pt-loaded NbON (0.10 g) was suspended in 200 mL of a 10-vol % methanol aqueous solution. FIG. 8 shows time course of hydrogen production under visible light irradiation having a wavelength of 420 nm to 800 nm. Using a 300-W xenon lamp as the light source, photoirradiation was performed through a cold mirror capable of shielding light other than the light having a wavelength of 420 nm to 800 nm. As a result, the production of hydrogen occurred at an initial rate of 0.8 μmol hour⁻¹ as shown in FIG. 8. It was confirmed from this that Pt-loaded NbON had a photocatalytic function for reducing protons in the methanol aqueous solution to hydrogen by irradiation with visible light.

Comparative Example 2

Pt-loaded NbON (0.10 g) was suspended in 200 mL of a 10-vol % methanol aqueous solution in the same manner as in Example 5. The amount of hydrogen production when this suspension was placed in a dark place was measured. However, even after 45 hours from the start, no hydrogen was detected. This proved that the hydrogen producing reaction from the suspension in Example 5 proceeded due to the function of NbON as a photocatalyst.

Example 6

Figure 9:
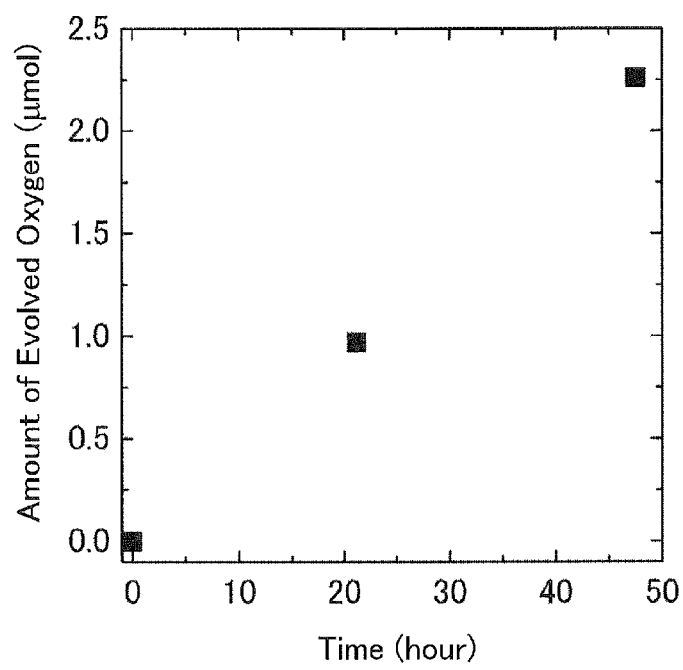
FIG. 9 is a graph showing time course of oxygen production using the optical semiconductor according to Example 6 of the present disclosure under light irradiation at a wavelength of 420 nm to 800 nm.

NbON (0.10 g) synthesized in Example 1 was suspended in 200 mL of a 0.01-M (mol L$^{-1}$) silver nitrate solution. FIG. 9 shows time course of oxygen production under visible light irradiation having a wavelength of 420 nm to 800 nm. Using a 300-W xenon lamp as the light source, photoirradiation was performed through a cold mirror capable of shielding light other than the light having a wavelength of 420 nm to 800 nm. As a result, the production of oxygen occurred at an initial rate of 0.06 μmol hour$^{-1}$ as shown in FIG. 9. It was confirmed from this that NbON had a photocatalytic function for oxidizing water in the silver nitrate solution to oxygen by irradiation with visible light.

Comparative Example 3

NbON (0.10 g) was suspended in 200 mL of a 0.01-M (mol L$^{-1}$) silver nitrate solution in the same manner as in Example 6. The amount of oxygen production when this suspension was placed in a dark place was measured. However, even after 45 hours from the start, no oxygen was detected. This proved that the oxygen producing reaction from the suspension in Example 6 proceeded due to the function of NbON as a photocatalyst.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

The optical semiconductor of the present disclosure can be used suitably as a visible light-responsive photocatalyst, and is useful, for example, in techniques relevant to photocatalysts such as a device that produces hydrogen using sunlight. Further, the method for producing the optical semiconductor of the present disclosure can be used also as a method for producing visible light-responsive photocatalysts. In addition, it also can be used in the nitriding process of a metal compound, etc.

What is claimed is:

1. A photocatalyst consisting of:
an optical semiconductor consisting of:
niobium oxynitride having a single-phase crystal structure of baddeleyite and having a composition represented by a composition formula of NbON.

2. A hydrogen producing device comprising:
the photocatalyst according to claim 1;
an electrolyte containing water, the electrolyte being in contact with the photocatalyst; and
a housing accommodating the photocatalyst and the electrolyte, wherein
hydrogen is generated through decomposition of water by irradiation of the photocatalyst with light.

3. An energy system comprising:
the hydrogen producing device according to claim 2;
a fuel cell; and
a line for supplying hydrogen produced in the hydrogen producing device to the fuel cell.

4. The photocatalyst according to claim 1, wherein
a bottom of a conduction band of the photocatalyst is located at a potential on an electrochemically negative side with respect to a reduction potential of proton, and
a top of a valence band of the photocatalyst is located at a potential on an electrochemically positive side with respect to an oxidation potential of water.

* * * * *